July 4, 1933.  J. B. WINFREE, JR  1,916,596
CLEANER FOR CAKE CUTTING MACHINES
Filed May 28, 1930   3 Sheets-Sheet 1
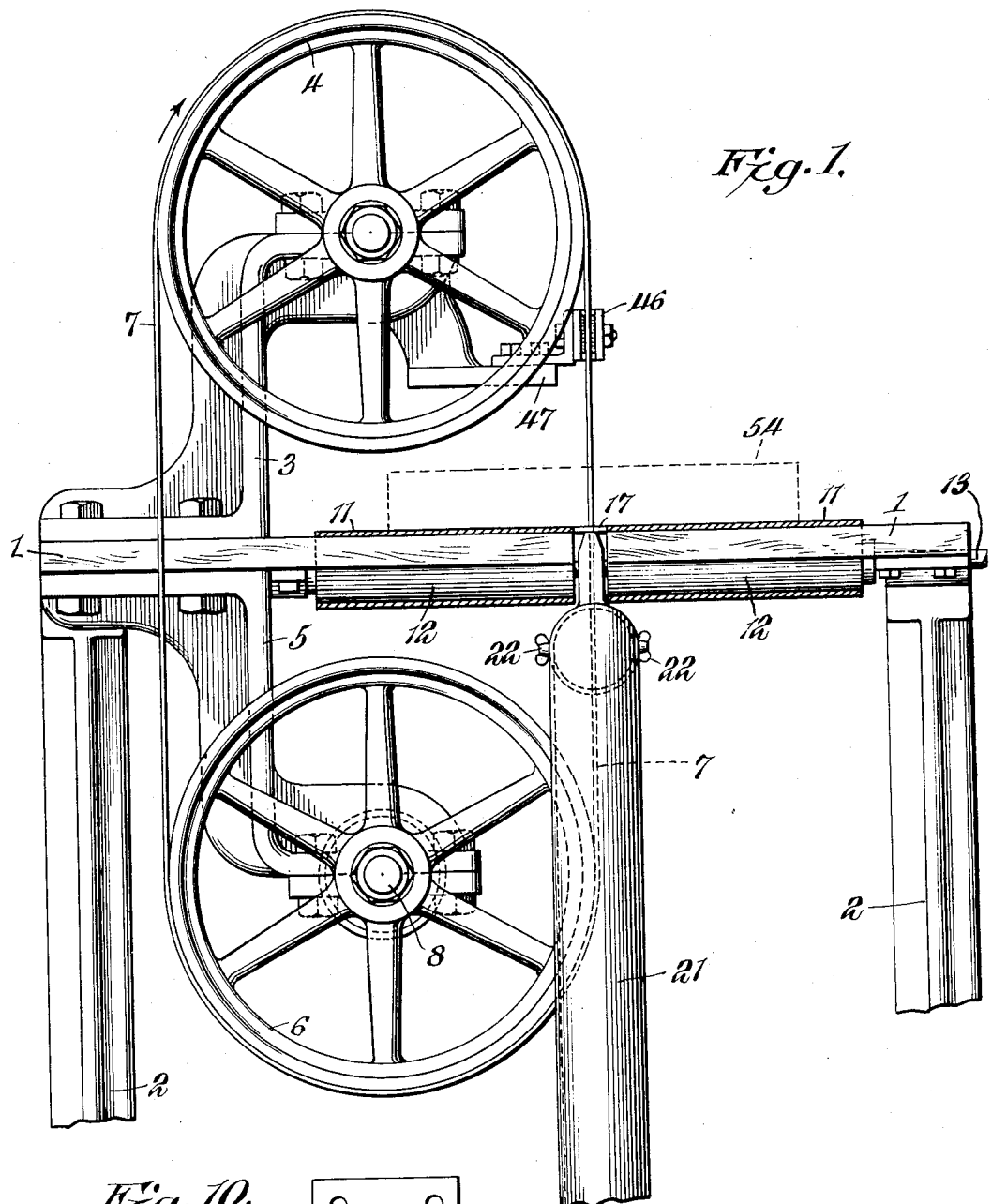
Fig. 1.
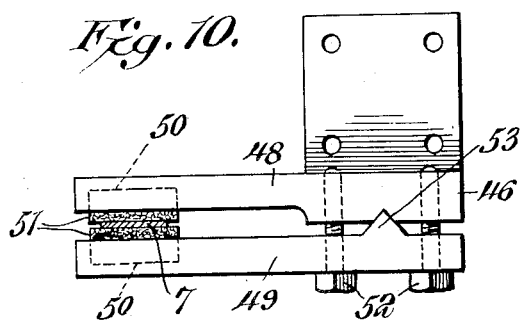
Fig. 10.
Inventor,
John B. Winfree, Jr.,
By Emil Börnelycke
Attorney July 4, 1933.  J. B. WINFREE, JR  1,916,596
CLEANER FOR CAKE CUTTING MACHINES
Filed May 28, 1930  3 Sheets-Sheet 2
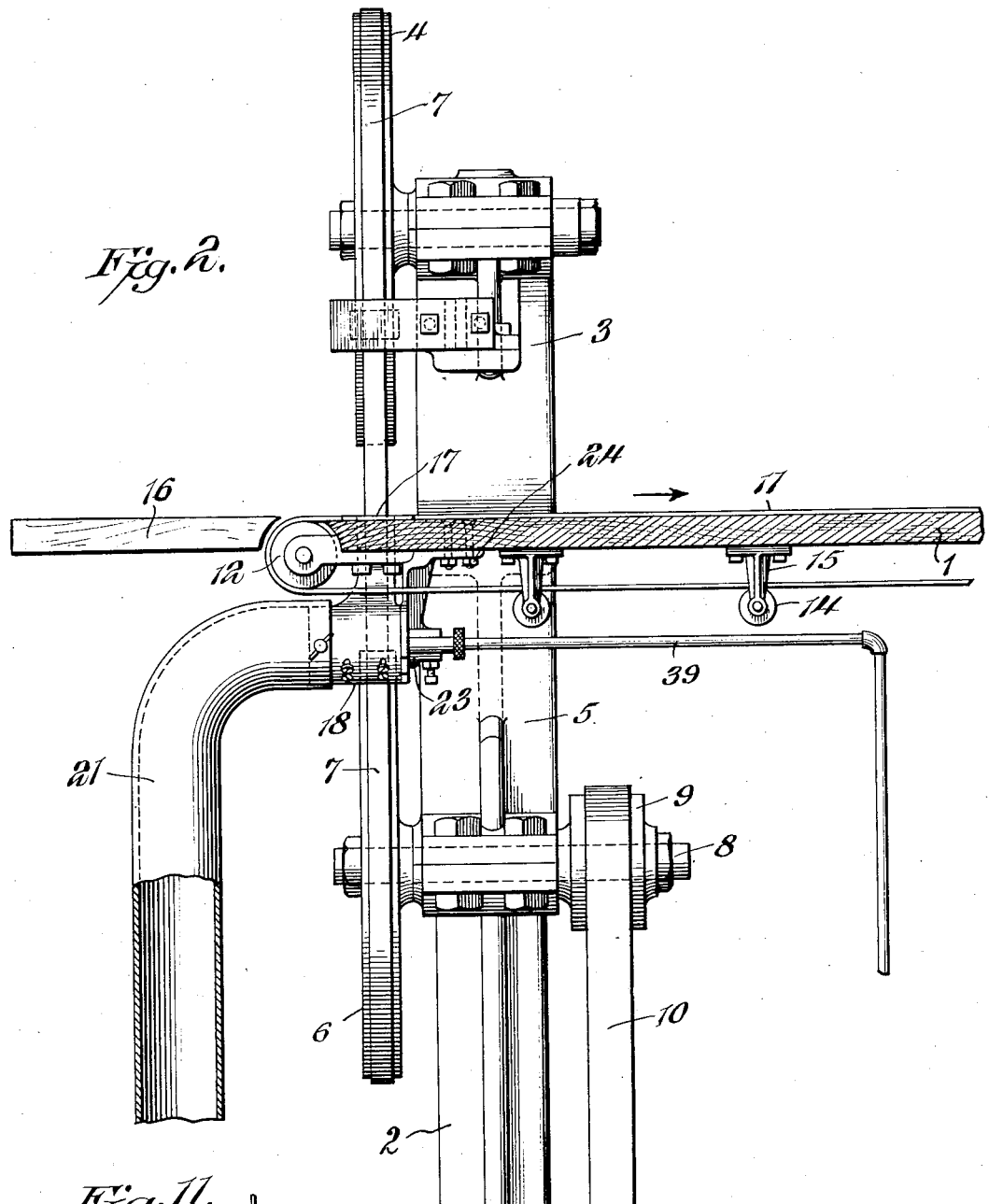
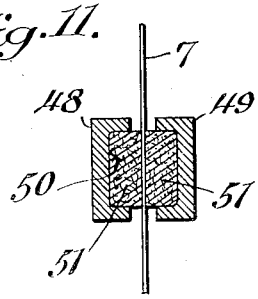
John B. Winfree, Jr., Inventor,
By Emil Bonnelycke
Attorney

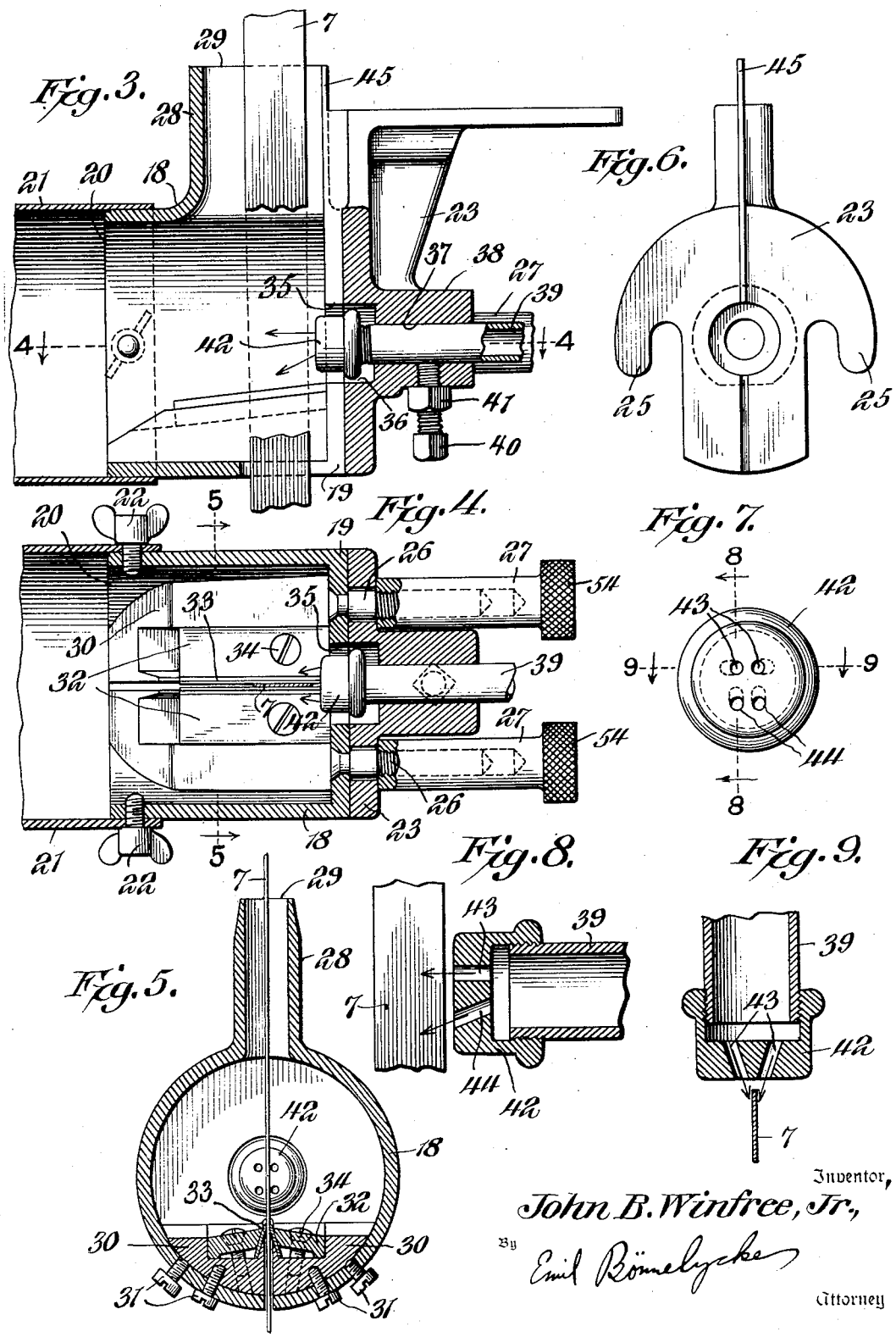

Patented July 4, 1933

1,916,596

UNITED STATES PATENT OFFICE

JOHN BELL WINFREE, JR., OF LYNCHBURG, VIRGINIA

CLEANER FOR CAKE-CUTTING MACHINES

Application filed May 28, 1930. Serial No. 456,752.

The present invention relates to a cleaning and sterilizing device for the band knives of cutting and slicing machines, particularly for cake and other bakery products. More specifically, the device is adapted to clean, scrape and sterilize the rapidly moving band knife of a cake-cutting machine and to maintain the band in an absolutely clean and sterilized state at all times.

A further object of the invention resides in the specific relation and cooperation of the cleaning, scraping and sterilizing features and also in the specific mounting of the various details and the specific elements.

A still further object of the invention resides in the application of a heated fluid, preferably steam and under pressure, which will not only sterilize the band but will also heat the band to a certain extent, as well as loosen the matter on the band to be immediately thereafter scraped therefrom.

In machines heretofore used and constructed for cutting cake, it has been determined that the cutting blades or bands very soon become sticky and covered and crusted with sugar from the icing and particles of fruits, raisins and nuts which adhere thereto, which necessitates frequent shutdown of the machine to scrape and wash the band and also other parts of the machine. Also, it has been found that cake cut with a soiled and dirty band soon becomes rancid and moldy on the cut surface thereof, thus necessarily materially limiting the time between completion and delivery of the cut cake from the bakery and its consumption. It has been further determined that the soiled bands very soon make a ragged and jagged cut and the longer the use of the band without stopping it for cleaning the more ragged and unsatisfactory, as well as unsightly, becomes the cut. Attempts have been made to increase the speed of the band, but that did not materially increase the length of service of the machine before a cleaning of the band became necessary.

The machine according to the present invention can be run for an indefinite period since the cleaning, scraping and sterilizing devices and means will keep the band in an absolutely clean and sterilized state. Also, the continuous application of steam to both sides of the band will heat the band to a certain extent, which is highly desirable in order to produce a clean and perfect cut surface of the cake. Furthermore, the steam will maintain the band slightly moist, which further adds to the attainment of a cut surface of the highest perfection, adding, naturally, to the appetizing and artistic appearance of a cut piece of cake. Also, the cut surface of an iced cake presents a sharp boundary line between the cake and the icing and not a particle of the icing is pulled down over the cut surface. The machine also cuts fruit cakes just as well, the band cleanly cutting through fruits, nuts and raisins without the slightest "drag" taking place or showing on the cut surface.

Further objects will be apparent from the following description taken in connection with the accompanying drawings.

Referring specifically to the drawings in which like reference characters refer to corresponding parts throughout:

Figure 1 is a front view of a cake-cutting machine showing the cleaner and sterilizer;

Fig. 2 is a side view of the machine, the table thereof being in section;

Fig. 3 is a vertical longitudinal section of the cleaner and sterilizer together with its securing bracket;

Fig. 4 is a horizontal longitudinal section of the cleaner and bracket taken on line 4—4 of Fig. 3;

Fig. 5 is a lateral cross-section taken on line 5—5 of Fig. 4;

Fig. 6 is a front view of the bracket;

Fig. 7 is a front view of the steam nozzle;

Fig. 8 is a vertical longitudinal section of the nozzle taken on line 8—8 of Fig. 7;

Fig. 9 is a horizontal longitudinal section of the nozzle taken on line 9—9 of Fig. 7;

Fig. 10 is a top view of the felt wiper for the band knife, and

Fig. 11 is a vertical section through the felt pads and its pockets.

The machine comprises a table 1 which is mounted on legs or supports 2. A bracket 3 is suitably bolted on top of the table and forms a bearing and support for the upper band wheel 4. A similar bracket 5 is suitably bolted to the underside of the table and forms a bearing and support for the lower band wheel 6. These wheels 4 and 6 carry and guide the endless band knife 7, preferably having smooth edges, without teeth, and preferably composed of an endless and thin strip or ribbon of steel.

The lower wheel 6 is secured on a shaft 8 and mounted in a bearing in the bracket 5 and this shaft also has a pulley 9 thereon. The band knife 7, therefore, receives its motion in its endless path by means of lower wheel 6, shaft 8, pulley 9 and belt 10, the latter being suitably driven by an electric motor, not shown.

A number of details of the machine have been omitted from Figs. 1 and 2 of the drawings, such as guards, etc., for sake of clearness, but the cake feed has been included. This feed preferably comprises a pair of endless belts 11 of fabric or other suitable material traveling around end rollers 12, one set, Fig. 1, being mounted on a shaft 13, which is driven at a reduced speed from the electric motor. The belts slide on the top of the table in the direction of the arrow in Fig. 2 and return under the table, preferably on idle rollers 14 supported by brackets 15 secured to the underside of the table. A forward rest 16, Fig. 2, is suitably secured to the table, in any desired manner, on which the cake rests before it is pushed on the belts 11. On the table and between the belts, there is secured a small plate 17, preferably of brass, through which the band travels through a slit therein. This plate can be of any desired length, but it need only be of a length to project behind the band a slight distance. The front rollers 12 in Fig. 1 (shown, however, in Fig. 2) have been omitted and the belts 11 have been sectioned at the front end of the table to more clearly show the specific construction and arrangement.

The cleaner and sterilizer consists of a cylindrical casing 18, one end 19 being closed and the other end 20 being open. To the open end 20, there is removably secured a pipe 21 which fits over the casing and is preferably secured thereto by winged nuts 22. The casing 18 is secured to the bottom of the table by means of a bracket 23 which is bolted to the underside of the table by bolts 24. The bracket is provided with two side arms or lugs 25 adapted to receive the two screws 26 secured in the closed end 19 of the casing 18. An elongated nut 27, having a knurled end 54, cooperates with each screw and by means of which the casing can be tightly secured to the bracket, as clearly shown in Fig. 4. The elongation of the nut provides for a quick and handy removal of the casing 18 for cleaning and other purposes.

The casing 18 has an upwardly extending and preferably integral neck portion 28, which is preferably rectangular in cross-section and contacts at its upper open end 29 with the plate 17. As shown in Figs. 3 and 5, the band knife 7 passes through the neck portion and through the casing 18.

At the bottom of the casing, there is provided the scraping means or elements consisting of a base portion 30 adjustably secured in the casing by screws 31. A wedge 32 in a groove on the top of each base portion, Fig. 5, acts to secure the thin scraper blade 33 in place by means of a screw 34. As shown in Fig. 5, the band knife 7 passes through the scraper device, that is, there is a base portion 30, a wedge 32 and a blade 33 on each side thereof so that both sides of the band knife will be scraped of any loosened particles or icing adhering thereto.

A perforation 35 is provided in the closed end 19 of the casing 18 corresponding to a similar perforation 36 in the bracket 23. Also, a perforation 37 is provided in the projecting portion 38 of the bracket 23, which is adapted to receive a steam pipe 39 projecting into and through the perforation 37. The pipe 39 is secured in the portion 38 by means of a set screw 40 provided with a lock nut 41.

The pipe 39 is provided with a nozzle 42 preferably in screwthreaded engagement therewith and provided in the perforations 35 and 36. This nozzle has two pairs of passages therein, the upper passages 43 being directed toward one another, Figs. 7 and 9, and the lower passages 44 being parallel to each other but directed downwardly, Figs. 7 and 8.

In order to remove the casing 18 from the bracket, the closed end 19 thereof, as well as the neck portion 28, has a slot therein so that these parts can be placed over the band knife or be removed therefrom so that the band can travel through the casing. In order to close the upper portion of the slot in the casing above the nozzle and in the neck portion, the bracket 23 is provided with a closure plate 45, which fits into the slot and also acts as a guide when placing the casing on the bracket.

A final excess moisture removing device 46 is provided on the bracket 3 by means of an extension 47. This device comprises two plates 48 and 49, each having a pocket 50 therein to each receive a pad 51, preferably of felt. The plates may be adjusted by means of screws 52, due to the projection 53 on plate 49 acting as a fulcrum on the plate 48. By this construction, the pressure exerted by the pads on the band knife can be adjusted according to special requirements.

The cleaning and sterilizing operation is as follows:

The band knife 7 travels in the direction indicated by the arrow in Fig. 1 and cuts the cake outlined by dotted lines 54, which is fed by means of the belts 11. The band knife, after passing through the cake, passes the slit in plate 17 and then through the neck portion 28 and enters the casing 18. When in front of the nozzle 42, the heated fluid, preferably steam, is directed on each side of the band by means of passages 43, Fig. 9, directing the jets of steam from the rear edge of the band toward the front or cutting edge. The steam will not only sterilize the band, but will tend to blow or force off any particles of cake and also loosen or soften any sticky or gummy material, such as, icing, particles of raisins, etc. on the band. Immediately thereafter, the band passes between the two scraper blades 33 which will scrape off the loosened and softened material or cake matter from the band, the band then passing out through the bottom of the casing in a perfectly clean and sterilized state. Due to the application of steam, excess moisture may remain or accumulate on the band and this excess is removed by the felt pads 51 as the band passes therethrough. In order to remove the particles and material from the blades 33 and from the top of the wedges 32 and the portions 30, steam jets are also directed through a pair of passages 44, Figs. 7 and 8, whereby each jet of steam is directed against the scraper, wedge and base portion to force and blow the scraped material from the casing into the exhaust pipe 21. The escape of steam through the neck portion 28 is prevented by the plate 17, which closes the top opening 29 of the neck portion, the band traveling through the plate through a close fitting slit or slot.

If necessary, further passages can be provided in the nozzle 42 to provide for additional jets of steam and the various elements and parts of the cleaner can be modified within the scope of the present invention as claimed to meet certain requirements

I claim as my invention:—

1. A band knife cleaner and sterilizer particularly for cake-cutting machines, comprising a nozzle having a pair of passages therein for directing a jet of heated fluid on each side of the band in a direction from the rear edge of the band toward the front or cutting edge and a pair of passages therein below the first-named pair of passages for directing a jet of heated fluid against each side of the band to remove any cake matter.

2. A band knife cleaner and sterilizer particularly for cake-cutting machines, comprising a casing through which the band travels; a nozzle in the casing having passages therein directing two jets of steam on each side of the band one jet directed against the band to loosen and remove cake matter thereon; and a scraping device in the casing mounted to scrape and remove the cake matter from the band loosened by the steam jets, the other jet directed against the scraping device to remove the cake matter therefrom.

3. A band knife cleaner and sterilizer particularly for cake-cutting machines, comprising a casing through which the band travels; a nozzle in the casing having passages therein directing a jet of steam on each side of the band to sterilize the band and remove and loosen cake matter thereon; and a scraping device in the casing mounted to scrape and remove the cake matter from the band loosened by the steam jets, said nozzle also having passages therein adapted to direct a jet of steam on the scraping device to remove the scraped matter from the casing.

4. A band knife cleaner and sterilizer particularly for cake-cutting machines, comprising means for directing a jet of steam on each side of the band to remove and loosen cake matter therefrom; a device for scraping each side of the band to remove the cake matter therefrom loosened by the steam; and means for removing any excess moisture from the band, said first-named means also directing a jet of steam on the scraping device to remove the cake matter therefrom.

5. A band knife cleaner and sterilizer particularly for cake-cutting machines, comprising a casing through which the band travels; a pair of scrapers adjustably mounted in the bottom of the casing and contacting with the sides of the band; and a nozzle in the casing having passages therein directing a jet of steam on each side of the band, to treat and sterilize the band, and on the scrapers, said scrapers removing the cake matter from the band loosened by the jets of steam thereon.

6. A band knife cleaner and sterilizer particularly for cake-cutting machines, comprising a casing through which the band travels; a pair of scrapers adjustably mounted in the bottom of the casing and contacting with the sides of the band; a nozzle in the casing having passages therein directing a jet of steam on each side of the band, to treat and sterilize the band, and on the scrapers, said scrapers removing the cake matter from the band loosened by the jet of steam thereon; and means for leading the steam and cake matter from the casing.

7. A band knife cleaner and sterilizer particularly for cake-cutting machines, comprising a cylindrical casing having an open end and a closed end and the band traveling through the casing; a nozzle mounted in the closed end of the casing and positioned to stream jets of steam into the casing, one jet being directed on each side of the band to remove and loosen cake matter on the band and to sterilize it; and a scraper on each side of the band secured at the bottom of the casing and contacting the band to scrape the cake matter from the band which is loosened by the steam, another jet of steam being directed against each scraper.

8. A band knife cleaner and sterilizer particularly for cake-cutting machines, comprising a cylindrical casing having an open end and a closed end and the band traveling through the casing; a nozzle in the closed end of the casing and positioned to stream jets of steam into the casing, one jet being directed on each side of the band to remove and loosen cake matter on the band and to sterilize it; and a scraper on each side of the band secured at the bottom of the casing and mounted to scrape the cake matter from the band which is loosened and softened by the steam, said jets also being directed on the scrapers to remove the cake matter from the casing through the open end thereof.

9. A band knife cleaner and sterilizer particularly for cake-cutting machines, comprising a cylindrical casing having an open end and a closed end and the band traveling through the casing; a nozzle in the closed end of the casing and positioned to stream jets of steam into the casing, one jet being directed on each side of the band to remove and loosen cake matter on the band and to sterilize it; a scraper on each side of the band secured at the bottom of the casing and mounted to scrape the cake matter from the band which is loosened and softened by the steam, said jets also being directed on the scrapers; and a pipe on the open end of the casing through which the steam and cake matter is removed from the casing.

10. A band knife cleaner and sterilizer particularly for cake-cutting machines, comprising a cylindrical casing having an open end and a closed end and an upwardly extending neck portion, said band traveling through the neck portion and the casing; a nozzle in the closed end of the casing and having passages therein to direct jets of steam into the casing, one jet being directed on each side of the band to clean and loosen cake matter thereon and to sterilize it; a scraper adjustably mounted on each side of the band to remove the cake matter from the band loosened and softened by the steam, a jet of steam being directed on each scraper to remove the cake matter from the casing; and a pipe on the open end of the casing to carry off the steam and the cake matter.

11. A band knife cleaner and sterilizer particularly for cake-cutting machines, comprising a cylindrical casing having an open end and a closed end and an upwardly extending neck portion, said band traveling through the neck portion and the casing; a nozzle in the closed end of the casing and having passages therein to direct jets of steam into the casing, one jet being directed on each side of the band to clean and loosen cake matter thereon and to sterilize it; a scraper adjustably mounted on each side of the band to remove the cake matter from the band loosened and softened by the steam, a jet of steam being directed on each scraper to remove the cake matter from the casing; a pipe on the open end of the casing to carry off the steam and the cake matter; and means for securing the casing to a table of the cake-cutting machine.

12. A band knife cleaner and sterilizer particularly for cake-cutting machines, comprising a casing through which the band travels; and a steam nozzle in the casing having two pairs of passages therein, one pair directed towards each other so that a jet of steam will be directed on each side of the band in a direction from the rear edge of the band toward the front or cutting edge, and the other pair of passages being parallel and downwardly directed relative to the first-mentioned pair, the jets of steam from the first-mentioned pair of passages cleaning and sterilizing the band and the jets of steam from the second-mentioned pair forcing the matter removed from the band out of the casing.

13. A band knife cleaner and sterilizer particularly for cake-cutting machines, comprising a casing through which the band travels; a steam nozzle in the casing having two pairs of passages therein, one pair directed towards each other so that a jet of steam will be directed on each side of the band in a direction from the rear edge of the band toward the front or cutting edge, and the other pair of passages being parallel and downwardly directed relative to the first-mentioned pair, the jets of steam from the first-mentioned pair of passages treating, cleaning and sterilizing the band and the jets of steam from the second-mentioned pair forcing the matter removed from the band out of the casing; and a pair of pads, one on each side of the band to remove any excess moisture therefrom.

14. A band knife cleaner and sterilizer particularly for cake-cutting machines, comprising a casing through which the band travels; a steam nozzle in the casing having two pairs of passages therein, the passages of one pair directed towards each other so that a jet of steam will be directed on each side of the band in a direction from the rear edge of the band toward the front or cutting edge, and the other pair of passages being parallel and downwardly directed relative to the first-mentioned pair; and a scraper for each side of the band, the jets of steam from the first-mentioned pair of passages loosening the cake matter on the band and sterilizing the band and the jets of steam from the second-mentioned pair of passages forcing the scraped cake matter from the casing.

15. A band knife cleaner and sterilizer particularly for cake-cutting machines, comprising a casing through which the band travels; a steam nozzle in the casing having two pairs of passages therein, the passages of one pair directed towards each other so that a jet of steam will be directed on each side of the band in a direction from the rear edge of the band toward the front or cutting edge, and the other pair of passages being parallel and downwardly directed relative to the first-mentioned pair; a scraper for each side of the band, the jets of steam from the first-mentioned pair of passages loosening the cake matter on the band and sterilizing the band and the jets of steam from the second-mentioned pair of passages forcing the scraped cake matter from the casing; and a pair of pads, one on each side of the band to remove any excess moisture therefrom.

16. A band knife cleaner and sterilizer particularly for cake-cutting machines, comprising means for directing at least two jets of steam on each side of the band in a direction from the rear edge of the band toward the front or cutting edge; and means for removing any cake matter from the band, one jet of steam being directed on the band to loosen and soften any cake matter on the band and the other jet being directed on and cooperating with the means for removing the cake matter.

In testimony whereof, I affix my signature.

JOHN BELL WINFREE, Jr.